United States Patent
Attwood et al.

(10) Patent No.: US 7,137,144 B1
(45) Date of Patent: Nov. 14, 2006

(54) TECHNIQUE OF DEFENDING AGAINST NETWORK CONNECTION FLOODING ATTACKS

(75) Inventors: Kira Sterling Attwood, Chapel Hill, NC (US); Linwood Hugh Overby, Jr., Raleigh, NC (US); Chien-En Sun, Chapel Hill, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/502,478

(22) Filed: Feb. 11, 2000

(51) Int. Cl.
*H04L 9/00* (2006.01)
(52) U.S. Cl. .......................... 726/13; 726/22
(58) Field of Classification Search .......... 713/201; 709/205, 225, 219, 203, 235; 708/203; 726/13, 726/11, 22
See application file for complete search history.

(56) References Cited

U.S. PATENT DOCUMENTS

| | | | | |
|---|---|---|---|---|
| 6,377,548 B1* | 4/2002 | Chuah | ........................ | 370/233 |
| 6,725,378 B1* | 4/2004 | Schuba et al. | .............. | 713/201 |
| 6,754,714 B1* | 6/2004 | Chebrolu | .................... | 709/229 |

FOREIGN PATENT DOCUMENTS

| | | |
|---|---|---|
| WO | 9948303 | 9/1999 |
| WO | 0153958 | 7/2001 |

OTHER PUBLICATIONS

Karanjit Siyan, "Netware TCP/IP and NFS", 1994, New Riders Publishing, p. 76-82.*
Pars Mutaf, "Defending against a Denial of Service Attack on TCP", http://www.raid-symposium.org/raid99/PAPERS/ParsMutaf.pdf.*
"Behind the Hack Attack", Time Magazine, article by: Chris Taylor (4 pages).
"False Requests Flood, Shut BLS Web Site", by Rajiv Chandrasekaran, Washington Post Staff Writer, . Jan. 9, 1998; p. G03.

* cited by examiner

*Primary Examiner*—Emmanuel L. Moise
*Assistant Examiner*—Thomas Ho
(74) *Attorney, Agent, or Firm*—Jerry W. Herndon, Esq.; Steven M. Greenberg, Esq.; Christopher & Weisberg, P.A.

(57) ABSTRACT

The invention prevents server overload and possible server crippling due to a flooding of connect requests caused by intentional attack or otherwise. In response to a connection request from a host for a specified port, the number of connections to the port that are assigned to the host are determined. If this number exceeds a first threshold, the request is denied. It is possible to override this denial if a quality of service parameter pertaining to the host permits such an override. However, if the number of available connections to the port is less than a second threshold, the connection request is denied in any event.

16 Claims, 2 Drawing Sheets

TECHNIQUE OF DEFENDING AGAINST NETWORK CONNECTION FLOODING ATTACKS

TECHNICAL FIELD

The invention relates generally to the field of networking and specifically to defending against attacks by malicious users attempting to disable a server by flooding the server with network traffic.

BACKGROUND OF THE INVENTION

Flooding attacks have recently been used with increasing frequency to target and disable servers on the Internet. A flooding attack occurs when a user sends a large number of requests to a server in a relatively short period of time with an intent to overload and thereby disable the server. A flood of packets from a malicious user can overload a server in the same way that a flood of packets from a misconfigured system can overload a server. But the end result is the same; the server becomes overloaded in trying to service the requests. This prevents legitimate requests from being timely served and often disables a server or causes it to crash. A number of flooding attacks have been reported in the news recently on well known web targets. Flooding attacks are very difficult for traditional intrusion detection systems to prevent due to the difficulty of determining whether traffic is legitimate or not.

SUMMARY OF THE INVENTION

The invention recognizes that the consequences of intentional flooding attacks and unintentional overload situations resulting from a burst of connection requests can be mitigated by dropping the traditional notion of attempting to distinguish between legitimate and illegitimate traffic. In the invention, all traffic is subject to a policy that attempts to guarantee that legitimate work will be performed and a server will not crash in flooding situations, irrespective of whether the flooding is caused by legitimate or illegitimate traffic. The invention helps to prevent a server from crashing due to overload and it prevents one or more attackers from consuming all server resources.

In response to a request from a host for a connection to a port number on a server, the number of connections to the port that are assigned to the host are determined. If this number exceeds a first threshold, the request for a connection is denied. In the preferred embodiment, it is possible to override a decision to deny a connection request if a quality of service parameter pertaining to the requesting host permits such an override. However, in the preferred embodiment, if the number of available connections to the port is less than a second threshold, the connection request is denied in any event. The denial of connections to a given host mitigate the effects of intentional or unintentional bursts of connection requests. The overriding of a decision to deny a given request based on a quality of service parameter specific to a requesting host helps in meeting service guarantees that may have been made to a specific host. However, even in the presence of overriding quality of service parameters, the denial of a connection when the number of available port connections becomes prohibitively small helps to prevent the complete disablement of a server.

In the preferred embodiment, the owner of a server specifies for each port number that is subject to flooding checks a maximum number of connections (M) allowed at any time to the port and a controlling percentage (P) of unassigned (available) connections remaining for the port. The invention keeps track of the number of assigned (unavailable) connections to a port and it calculates the number of available port connections by subtracting the number of unavailable connections from the maximum number of connections. The percentage P is used to establish the first threshold to trigger the initial decision to deny a connection request. Specifically, the initial denial is triggered if the existing number of connections assigned to the requesting host is equal to or greater than the threshold percentage of the available connections.

The maximum number of connections and the thresholds will be difficult for most owners to configure. Therefore, a "statistics" mode is provided that measures normal traffic loads of different servers and suggests appropriate maximums and thresholds that will not hamper similar legitimate traffic loads. This statistics mode is not part of the claimed invention and is not described further herein.

A similar technique can be applied to connectionless traffic, such as UDP datagrams.

DETAILED DESCRIPTION

The invention requires that an owner of a server using the invention configure the server with certain parameters. By way of example, the preferred embodiment requires that the owner specify for each port number subject to flooding checks a maximum number of connections (M) allowed at any time to the port and a threshold percentage (P) of available connections remaining for the port. The percentage P of available connections for a port establishes a first threshold that triggers the denial of a connection request. As connections are assigned and released, the server maintains the number of connections assigned to each host for each port. The server can therefore dynamically calculate the number of available connections for a port at the time a new request is received from the specified maximum number and the number of connections already assigned to the port.

Figure 1:
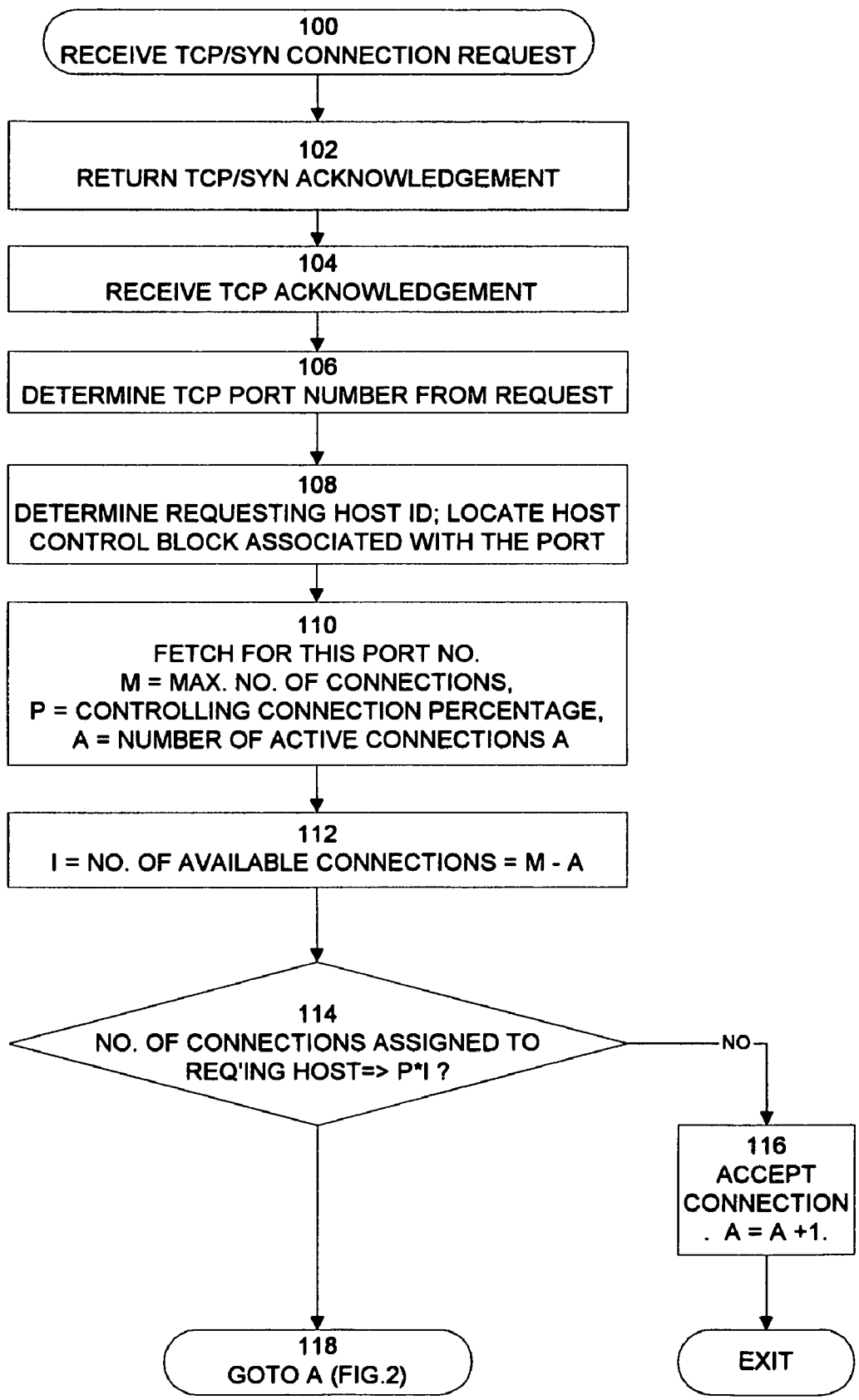
FIGS. 1 and 2 show an illustrative flowchart of operations executed at a server in response to the receipt of a request for connection to a port to ensure that flooding connection requests do not prevent the completion of other work and do not crash the server.

An entry is made to step 100 in FIG. 1 when a TCP/SYN request for a connection is first received at a network server. A SYN request is the first handshake of a three-flow protocol conventionally required to establish a TCP connection. At step 102, an acknowledgment to the TCP/SYN request is returned by the server to the host requesting a connection. At step 104, the requesting host returns a TCP acknowledgment. This completes the handshake protocol. Step 106 determines the port number to which the request is directed from the requesting host acknowledgment. In TCP, a port number represents a destination within a given host computer to which a connection is requested. Some ports are reserved for standard services. For example, convention specifies that port 21 is used by the File Transport Protocol (FTP). The identity (the IP address) of the requesting host is also determined during the handshake protocol. The port number is used by step 108 to locate a memory control block for the port or to create one if a port control block does not exist. Attached to the port control block are a plurality of host control blocks for hosts that presently have one or more active connections. If the requesting host does not have a host control block, one is created. A host control block contains, among other things, a count of the port connections presently assigned to the host.

At step 110, the server fetches the maximum number of connections M specified for this port number, the controlling percentage P and the number A of active connections. Step 112 calculates the number I of available connections as M−A. Step 114 determines if the number of connections already assigned to the requesting host is equal to or greater than P times I. If so, then the connection request will be denied unless certain other precautions override the denial. On the other hand, if the number of connections already assigned to the requesting host is less than P times I, the connection request is allowed at step 116 and A is incremented by one to update the number of connections active to this port number.

Figure 2:
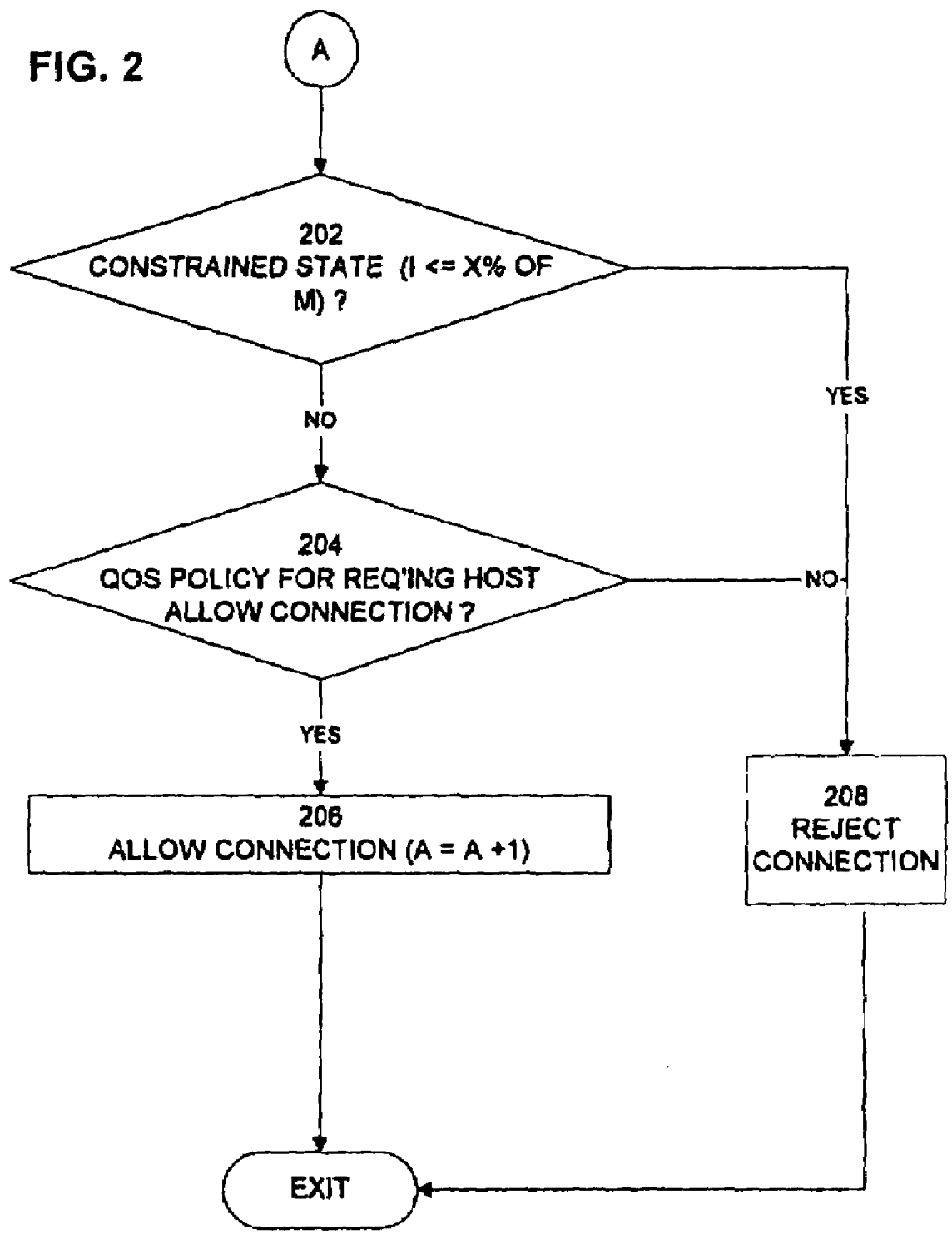

Connection point A in FIG. 2 is entered from step 114 if the number of connections already assigned to the requesting host is equal to or greater than P times I. Step 202 first determines if the port is in a constrained state. A port is in a constrained state if the number of idle connections remaining on the port is equal to or less than some percentage X of the maximum number M of connections allowed to the port. X is 10 percent in the preferred embodiment. If this is true, the connection request is rejected at step 208. However, if the port is not constrained, then a Quality of Service (QOS) specification that pertains specifically to the requesting host can override the decision to reject the connection. In this case, the request might be allowed at step 206, in which case the parameter A is updated by incrementing it by one. In other words, steps 202, 204 and 206 in conjunction implement a policy that rejects a connection request, unless a QOS policy pertaining to the requester overrides the denial. But, if the requested port is in a constrained state, meaning that only a small number of connections remain to the port, the request is denied in any event.

The computer program that has been described can be executed on virtually any type of computer, ranging from personal computers to large mainframes such as IBM's System 390 machines. The only requirement is that the computer is configured with network communication software and is accessible as a server via a network.

Skilled artisans in the fields to which the invention pertains will recognize that numerous variations can be made to the embodiments disclosed herein and still remain within the sprit and scope of the invention.

What is claimed is:

1. A method of preventing a flooding attack on a network server in which a large number of requests are received for connection to a particular port number on the server, comprising:

recognizing a particular host connecting to the port number on the server;

calculating a number of connections to the port attributed to the host;

determining, in response to a request from the host for a connection to the port, if the number of connections to the port attributed to the host exceeds a prescribed threshold, and, if so, denying the request for a connection.

2. The method of claim 1 in which denying the request further comprises: overriding the denial and allowing the request if a quality of service parameter pertaining to the requesting host permits the override.

3. The method of claim 2 wherein a connection request is denied in any event if the number of available connections to the port are less than a constrained threshold.

4. The method of claim 1 or claim 2 or claim 3 further comprising:

calculating the prescribed threshold by multiplying a percentage P by the number of available connections remaining for the port.

5. Apparatus for preventing a flooding attack on a network server in which a large number of requests are received for connection to a particular port number on the server, comprising:

means for recognizing a particular host connecting to the port number on the server;

means for calculating a number of connections to the port attributed to the host;

means for determining, in response to a request from the host for a connection to the port, if the number of connections to the port attributed to the host exceeds a prescribed threshold, and means responsive to the determining means for denying the request for a connection.

6. The apparatus of claim 5 in which means for denying further comprises: means responsive to a quality of service parameter pertaining to the requesting host for overriding a request denial and allowing the request.

7. The apparatus of claim 6 further comprising:

means for denying a connection request in any event if the number of available connections to the port are less than a constrained threshold.

8. The apparatus of claim 5 or claim 6 or claim 7 further comprising:

means for calculating the prescribed threshold by multiplying a percentage P by the number of available connections remaining for the port.

9. A storage media containing program code segments for preventing a flooding attack on a network server in which a large number of requests are received for connection to a particular port number on the server, comprising:

a first code segment activated to recognize a particular host connecting to the port number on the server;

a second code segment to calculate a number of connections to the port attributed to the host;

a third code segment activated in response to a request from the host for a connection to the port for determining if the number of connections to the port attributed to the host exceeds a prescribed threshold, and a fourth code segment responsive to the third code segment for denying the request for a connection.

10. The media of claim 9 in which the second code segment further comprises:

a fifth code segment for overriding the denial and allowing the request if a quality of service parameter pertaining to the requesting host permits the override.

11. The media of claim 10 further comprising a sixth code segment for denying a connection request in any event if the number of available connections to the port are less than a constrained threshold.

12. The media of claim 9 or claim 10 or claim 11 further comprising:

a seventh code segment for calculating the prescribed threshold by multiplying a percentage P by the number of available connections remaining for the port.

13. A carrier wave containing program code segments for preventing a flooding attack on a network server in which a large number of requests are received for connection to a port number on the server, comprising:
- a first code segment activated to recognize a particular host connecting to the port number on the server;
- a second code segment to calculate a number of connections to the port attributed to the host;
- a third code segment activated in response to a request from the host for a connection to the port for determining if the number of connections to the port attributed to the host exceeds a prescribed threshold, and
- a fourth code segment responsive to the third code segment for denying the request for a connection.

14. The carrier wave of claim 13 in which the second code segment further comprises:
- a fifth code segment for overriding the denial and allowing the request if a quality of service parameter pertaining to the requesting host permits the override.

15. The carrier wave of claim 14 further comprising a sixth code segment for denying a connection request in any event if the number of available connections to the port are less than a constrained threshold.

16. The carrier wave of claim 13 or claim 14 or claim 15 further comprising:
- a seventh code segment for calculating the prescribed threshold by multiplying a percentage P by the number of available connections remaining for the port.

* * * * *